United States Patent
Jain et al.

(10) Patent No.: US 8,996,454 B2
(45) Date of Patent: Mar. 31, 2015

(54) REMOTE MANAGEMENT AND ACCESS OF DATABASES, SERVICES AND DEVICES ASSOCIATED WITH A MOBILE TERMINAL

(75) Inventors: Kuldeep Jain, San Diego, CA (US); Anders F. Heie, Poway, CA (US)

(73) Assignee: Nokia Corporation, Espoo (FI)

( * ) Notice: Subject to any disclaimer, the term of this patent is extended or adjusted under 35 U.S.C. 154(b) by 2082 days.

(21) Appl. No.: 10/752,891

(22) Filed: Jan. 7, 2004

(65) Prior Publication Data

US 2005/0149564 A1 Jul. 7, 2005

(51) Int. Cl.
*G06F 7/00* (2006.01)
*H04L 29/08* (2006.01)

(52) U.S. Cl.
CPC ............... *H04L 67/26* (2013.01); *H04L 67/04* (2013.01); *H04L 67/02* (2013.01)
USPC ........................................................ 707/609

(58) Field of Classification Search
USPC ......... 707/104.1, 100, 10, 5, 1, 3, 4, 999.101, 707/999.102, 609
See application file for complete search history.

(56) References Cited

U.S. PATENT DOCUMENTS

| | | | | |
|---|---|---|---|---|
| 5,671,436 A | * | 9/1997 | Morris et al. ........................ | 1/1 |
| 6,049,796 A | * | 4/2000 | Siitonen et al. ................ | 707/711 |
| 6,112,206 A | * | 8/2000 | Morris et al. ........................ | 1/1 |
| 6,269,369 B1 | * | 7/2001 | Robertson .............................. | 1/1 |
| 6,473,790 B1 | * | 10/2002 | Tagi ............... | 709/216 |
| 7,032,003 B1 | * | 4/2006 | Shi et al. ........................ | 709/203 |
| 2002/0120719 A1 | * | 8/2002 | Lee et al. ...................... | 709/219 |
| 2002/0186845 A1 | | 12/2002 | Dutta et al. | |
| 2003/0083100 A1 | * | 5/2003 | Nakanaga ....................... | 455/557 |
| 2003/0169695 A1 | * | 9/2003 | Salo et al. ...................... | 370/264 |
| 2004/0030705 A1 | * | 2/2004 | Bowman-Amuah .......... | 707/100 |
| 2004/0085980 A1 | * | 5/2004 | Lee ................ | 370/412 |
| 2004/0172484 A1 | * | 9/2004 | Hafsteinsson et al. ......... | 709/246 |
| 2005/0071375 A1 | * | 3/2005 | Houghton et al. .......... | 707/104.1 |
| 2005/0131957 A1 | * | 6/2005 | Watkinson ..................... | 707/200 |
| 2005/0149564 A1 | * | 7/2005 | Jain et al. ................... | 707/104.1 |

FOREIGN PATENT DOCUMENTS

| | | |
|---|---|---|
| EP | 0973350 A3 | 1/2000 |
| JP | 2003-234938 A | 8/2003 |
| WO | WO 03/019415 A2 | 3/2003 |

OTHER PUBLICATIONS

Rejection Decision for related Chinese Application No. 200580005606.03 dated May 22, 2012, pp. 1-23.
Chinese Office Action for related Chinese Patent Application No. 200580005606.3 dated Dec. 6, 2011, pp. 1-20.
Chinese Office action for corresponding CN patent app. No. 200580005606.3 dated Jul. 6, 2010, pp. 1-11.

* cited by examiner

*Primary Examiner* — Hosain Alam
*Assistant Examiner* — Eliyah S Harper
(74) *Attorney, Agent, or Firm* — Ditthavong & Steiner, P.C.

(57) ABSTRACT

Apparatus, method and computer products are provided for remote network access and management of mobile terminals. The mobile terminal executes a web server application that allows remote network devices to access the mobile terminal. In addition, the mobile device executes a content engine that provides the ability to access databases, services and devices associated with the mobile terminal. The invention provides greater flexibility in accessing and managing the data stored on the mobile terminal and provides for remote control of the services and devices associated with the mobile terminal.

53 Claims, 3 Drawing Sheets

REMOTE MANAGEMENT AND ACCESS OF DATABASES, SERVICES AND DEVICES ASSOCIATED WITH A MOBILE TERMINAL

FIELD OF THE INVENTION

This invention relates to communication networks, and more particularly, relates to methods, apparatus, and computer programs for remotely managing and accessing the databases, services and devices associated with a mobile terminal.

BACKGROUND OF THE INVENTION

The use of mobile wireless communication terminals, such as mobile telephones, personal data assistants (PDAs) and the like have become commonplace in practically all facets of everyday life. Technological advances in the areas of processing capabilities, storage capacity and the like has made it possible for these terminals to execute robust operating systems that support a multitude of applications, services and device operations. For example, more and more current mobile telephone devices are equipped with digital cameras, video recorders, audio recorders, global positioning systems (GPS) and the like. Additionally, many of these terminals support one or more messaging services, such as Short Messaging Service (SMS) or the like, gaming capabilities and other services. For instance, mobile telephones are readily equipped with downloadable services, such as Mobile Information Device (MIDlet) applications.

As the amount of data, services and devices supported by handheld wireless communication terminals escalates, so too does the need to access and manage these features. Typically, access and management of the data, services and devices occurs via a secondary host, typically a personal computer, laptop computer, or the like, that form a wireline link with the terminal.

Currently, access and management of the data, services and devices supported by these terminals is limited. In most instances, updating data on the terminal or transferring information to or from the terminal requires the implementation of terminal-specific applications. For example, an image management application may be equipped to upload and download images from only certain device types. In addition, these applications typically require use of terminal-specific cables, docking stations and other hardware to communicate data between the terminal and a host. If the user chooses to change device type, the user is, all too often, burdened with the expense of obtaining new applications and/or new connection hardware. Use of such hardware further limits access and management, in the sense that, the terminal and the host, which are exchanging data, are in wireline communication and typically proximate in distance.

Remote user data management and, in particular Internet based configuration and data management is becoming more prevalent. For instance, many network embedded devices, such as routers, gateways, switches, nodes and the like can be configured via the Internet. In this environment, firmware and software residing on the device can be updated by the remote user, as well as, general device configuration management. As web browsers become more robust that ability to manage and access devices over the Internet becomes more viable.

Remote access to mobile devices would not only benefit configuration and file transfer, it would also greatly improve user accessibility to the device and the overall functionality of the device. As the amount of data stored on these devices increases our ability to have constant access to data increases. Remote access to the device would allow the user the opportunity to access the data regardless of whether the mobile terminal is in the possession of the user. For example, if the user intentionally or unintentionally leaves the mobile device outside of their immediate possession, the user may later have need to access the databases, services and devices associated with the mobile device while the mobile device is outside of their immediate possession.

In this regard the user would be able to tap into all the information that is stored in the terminal, such as contact information, SMS messages, calendared appointments etc, from a remote networked device.

In addition to remote user access to the functionality of the mobile terminal, service administrators would benefit from being able to remotely manage and configure devices. Typically, mobile terminal provisioning is conducted by having a user contact, via telephone, a service administrator and having the service administrator provide detailed instructions to the user on how to correctly configure or re-configure the terminal. In this scenario, the user of the device merely acts as an intermediary between the service administrator and the mobile terminal.

Thus, the need exists to develop methods, applications and mobile terminals that provide for remote user access and management. Such methods, applications and terminals will benefit from being able to provide access without the need to implement any additional software applications or hardware. Additionally, remote user access and management should provide for the user to access all the data, services and devices associated with the mobile terminal. The desired methods, applications and terminals will provide the user greater flexibility in accessing the data stored on the mobile terminal and provide remote control of the services and devices associated with the mobile terminal.

BRIEF SUMMARY OF THE INVENTION

The present invention provides apparatus, systems, methods and computer program products for remotely accessing and managing a mobile terminal. Specifically, the present invention provides for remote functional access to the devices, services and applications associated with a mobile terminal. As such, the user of the mobile terminal has remote access to all of the databases and functions provided by the mobile terminal. For example, if the user of the mobile terminal intentional or unintentionally is not in immediate possession of the terminal, the user may functionally access the databases, services and devices using a remote network device, such as a PC or laptop computer.

This invention will implement a conventional networking infrastructure, such as the Internet to access the mobile terminal and, thus, eliminates the need for additional hardware or additional software to be used to remotely access and/or remotely manage the mobile terminal. Additionally, by providing for functional access to the devices and services associated with the mobile terminal, the user of the remote network device is capable of remotely operating devices, such as telephones, cameras and the like or services, such as Short Message Service (SMS), email service or the like. In addition to user access, the invention provides for service providers or service administrators to remotely access and manage the mobile terminal. Such remote provisioning allows the service administrator to reach-out and manage the device without having the device in their possession or without the need to interface with the device user.

A first embodiment of the invention is defined be a mobile terminal apparatus. The mobile terminal apparatus includes a data processor that executes a web server application and a content engine application. The web server application provides for a remote network device to access the mobile terminal via a communication link, typically the Internet or any other suitable wireless or wireline communication link. The content engine is in communication with the web server application and provides functional access, by the remote network device, to one or more devices associated with the mobile terminal. The devices associated with the mobile terminal may include a telephone, a camera, a video play-back/recording device, an audio play-back/recording device, a Global Positioning System (GPS) device and the like.

In addition, the content engine may provide for functional access to one or more databases associated with the mobile terminal or one more services associated with the mobile terminal. The databases may include a telephone listing database, a calendar event database, a contact database, a message database, a telephone-listing database, a media file database, a text file database and the like. The services may include a Short message Service (SMS), an electronic mail service, an entertainment service, such as a game service, downloadable applications, e.g., MIDlet applications or the like.

The data processing device of the mobile terminal may additionally execute other applications that aid in accessing databases, services or devices associated with the mobile terminal or provide ancillary support to the functionality of the content engine. For example, the data processing unit may execute a display redirect application that provides for redirecting display of accessed devices from the mobile terminal display to a display associated with the remote network device. Additionally, the data processing unit of the mobile terminal may execute a security application that provides secure remote network device access to the one or more mobile terminal devices. The data processing unit may also execute a search engine application in communication with the content engine application that provides the user of the remote network device the capability to search mobile terminal databases, services and/or devices. An additional groupware application may be executed by the data processing device to provide the remote network device the capability to share, via the communication network, mobile device database information, services and/or devices information with one or more networked devices.

In addition, the data processing device of the mobile terminal may execute a HyperText Transfer Protocol (HTTP) push application in communication with the content engine application that provides for information to by pushed from the mobile terminal to the remote network device during an active networking session. Information may be pushed to the remote network device and displayed in the form of a pop-up window or any other type of information display may be implemented. The mobile terminal may also include a motion sensor that is in communication with the HTTP application such that detection of motion by the sensor prompts the HTTP push application to push information, such as video images or the like, to the remote network device.

The invention is also embodied in a method for providing a remote network device functional access to devices associated with a mobile terminal. The method includes the step of providing for a mobile terminal that implements a web server application and a content engine application that provides access, via the web server application, to one or more devices associated with the mobile terminal. The method further includes the steps of initiating a web browser application at a remote network device that provides for a network communication link; accessing, at the remote network device, the mobile terminal via a network connection to the web browser application; and activating, at the remote network device, one or more devices associated with the mobile terminal. The device activated at the remote network device may include a telephone device, a camera device, a video play-back/recorder device, a GPS device or the like. Thus, the method provides for the devices associated with the mobile terminal to be remotely controlled (i.e., accessed and activated) from a remote network device.

The step of providing for a mobile terminal that implements a content engine may further include a content engine that provides access, via the web server, to one or more databases associated with the mobile terminal and/or one or more services associated with the mobile terminal. In embodiments in which the content engine provides for accessing databases and services associated with the mobile terminal, the method may include steps for accessing, at the remote network device, one or more of the databases or activating, at the remote network device, one or more of the services.

Another method of the present invention is defined as a method for providing remote service management to a mobile terminal. Remote service management of a mobile terminal is instrumental to a mobile service provider, device manufacturer or the like that desires real-time management of devices in the field-of-use. The method includes the steps of accessing, at a remote network device, the mobile terminal via a network connection to a web browser application executed by the mobile terminal and managing the mobile terminal from the remote network device once the mobile terminal has been accessed by the remote network device. Managing the mobile terminal from the remote network device may include various different management functions. The management functions may include, displaying at the remote network device the identical display of information provided to the mobile terminal. Such identical display of information allows the service provider to take over functional control of the terminal and to guide the user of the terminal through diagnostic analysis or repair functions.

In addition, management functions may include debugging the mobile terminal by tracing data communicated from the mobile terminal. Typically, the mobile terminal will push requisite tracing data to the network device, which, in turn, performs a debugging application. Service providers or the like may also monitor various aspects of the mobile terminal; such as, signal strength, usage of applications, usage of devices and the like. Monitoring of the terminal provides the monitoring entity real time access to valuable data that can assist in providing better wireless service or better market research.

In yet another embodiment of the present invention, a computer program product for remotely accessing one or more devices associated with a mobile terminal is defined. The computer program product includes a computer-readable storage medium having computer-readable program code instructions stored therein. The computer-readable program code instructions include a first executable instruction capable of providing a remote network device access to a mobile terminal. In addition, the computer-readable program code instructions include a second executable instruction capable of providing the accessed remote network device functional access to one or more devices associated with the mobile terminal. Thus, the second executable instruction is capable of providing the accessed remote network device functional access to devices such as telephones, cameras, video recorders, GPS devices and the like.

The second executable instruction may include an instruction capable of providing the accessed remote device functional access to one or more databases associated with the mobile terminal. In this optional embodiment, the second executable instructions may provide the accessed remote network devices functional access to databases such a phonebook database, electronic mail database, calendar database, a media file database, a text file database, contact database and the like. Additionally, the second executable instruction may include an instruction capable of providing the accessed remote device functional access to one or more services associated with the mobile terminal. In this optional embodiment, the second executable instructions may provide the accessed remote network devices functional access to services such as, a messaging service, a MIDlet application, a search service and an entertainment service.

Additionally, the invention is embodied in a system for providing remote access to a mobile terminal. The system includes a mobile terminal including a first data processing device that executes a web server application and a content engine application in communication with the web server application. The content engine application provides functional access to one or more devices associated with the mobile terminal. The system additional includes a remote network device including a second data processor device that executes a web browser application that provides access to the web server application of the mobile terminal via a network connection. The web browser application additionally provides access to the content engine application of the mobile terminal for the purpose of functionally accessing one or more devices associated with the mobile terminal. The content engine application may additionally provide functional access to one or more databases associated with the mobile terminal and one or more services associated with the mobile terminal. The network connection that links the mobile terminal to the remote network device may include the Internet, a Universal Serial Bus (USB), a serial port connection, a parallel port connection, wireless local area network (WLAN), i.e., IEEE 802.11, InfraRed (IR) or the like.

Thus, the present invention provides for apparatus, systems, methods and computer program products for remote user access and management of mobile terminals. The invention benefits from being able to provide access without the need to implement at the remote network device any additional software applications or hardware. Additionally, the present invention provides for the remote network device to access all the databases, services and devices associated with the mobile terminal. As such, the invention provides greater flexibility in accessing the data stored on the mobile terminal and provides the remote network device remote control of the services and devices associated with the mobile terminal.

DETAILED DESCRIPTION OF THE INVENTION

Figure 1:
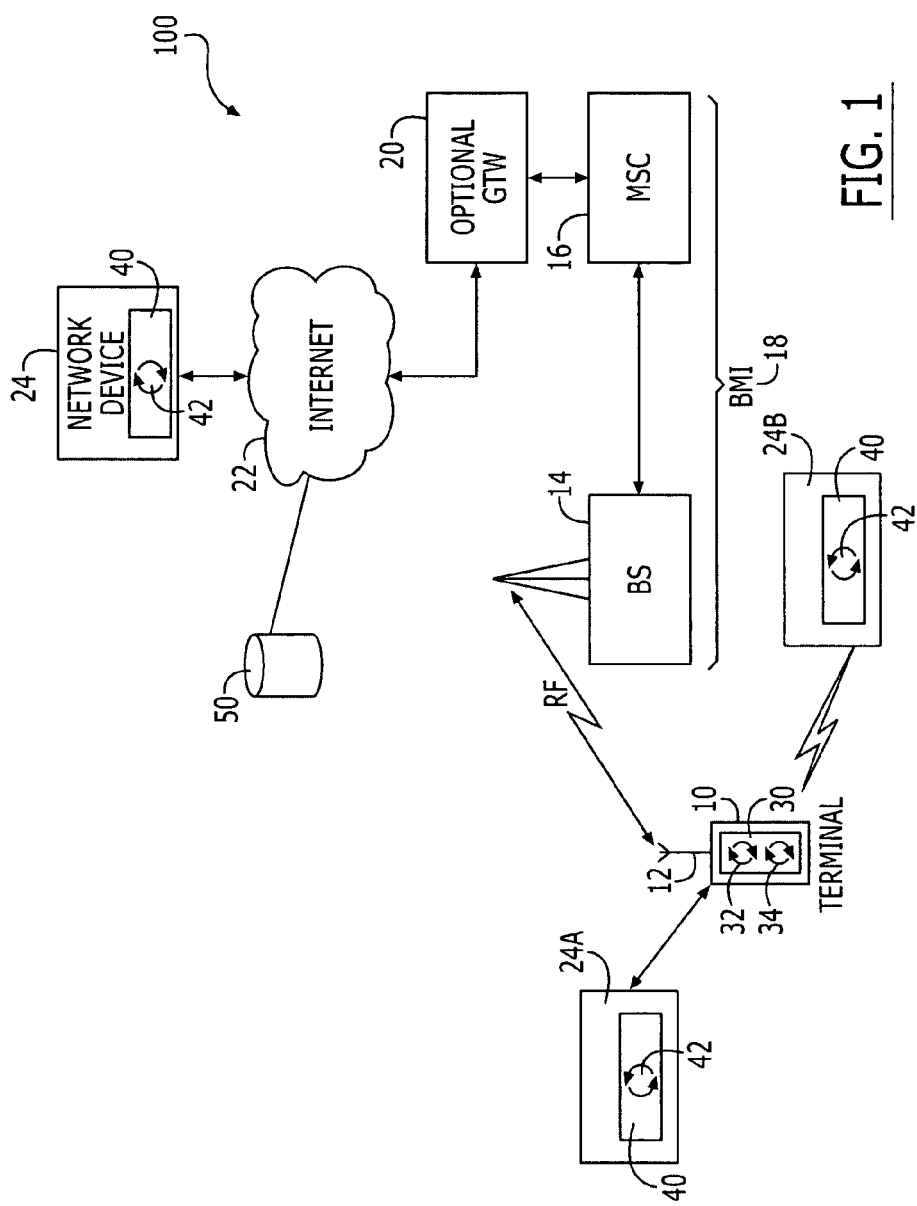
FIG. 1 is a block diagram of a wireless communication network that includes a mobile terminal having remote access and management capability, in accordance with an embodiment of the present invention.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for applications, methods, apparatus and systems for remote user access and management of mobile terminals. Specifically, the present invention utilizes a network connection, such as the Internet, between a remote network device, such as personal computer (PC), portable computer, or the like, and the mobile terminal to provide for remote user access and management of the mobile terminal. The invention provides for remote functional access to the databases, services and devices associated with a mobile terminal. In this regard, the present invention provides for the user of the mobile terminal to functionally access the databases, services and devices associated with the terminal, even in those instances in which the terminal is not in the physical possession of the user (i.e., the user forgets to bring the terminal with them or chooses not to physically possess the terminal.)

It is noted that the term "access", in this invention, refers to the ability to read, write and/or modify the databases and, in some instances, applications and devices associated with the mobile terminal. In this regard, the term "access" should not be construed as limited in meaning to reading the contents of a database, executing an application or activating a device associated with the terminal.

In accordance with an embodiment of the present invention, a mobile terminal is defined that provides for remote user access and management. The mobile terminal may be any mobile terminal that provides for network connection, typically wireless network connection, although it possible for the network connection to be limited to conventional wireline methods. As such, the mobile terminal may include a wireless mobile telephone, a personal data assistant (PDA), camera, positioning devices, and the like. The mobile terminal will execute a web server application that provides remote network devices access to an addressable website, portal or homepage that resides on the mobile terminal. In this regard, the mobile device will generally function similar to an origin server residing in the Internet. The web server application will typically be less robust than a conventional web server application to allow for the application to be implemented in mobile terminals, which typically have far less processing and memory capabilities than origin servers.

In addition to the web server application, the mobile terminal will also execute a content engine application. The content engine application is in communication with the web server application and serves to provide the web server application, upon request by the remote network user, with access to data, services and devices associated with the mobile terminal. In addition to providing access to the databases, services and devices, associated with the mobile terminal, the content engine is also responsible for redirecting, from the mobile terminal display to the display associated with the remote network device, the visual presentations associated with the data, services and devices.

In addition to providing the user of the mobile terminal access to the databases, services and devices associated with the terminal, the invention further provides for third parties to have remote access to the mobile terminal. Typically third party access will require secure access to the device in the form of log-on and password protection. In one application, service administrators or support personnel will remotely access and provide requisite provisioning to the terminal. In this instance the remote service administrator can access the mobile terminal and view the same display as the user. Simultaneous display of the same information by the user and the service administrator and functional access to the services of the terminal by the service administrator allows the service administrator to take control of the terminal and guide the user through complicated service related functions. Service administrators, such as cellular telephone operators, can perform debugging operations by implementing a HTTP push application on the remote terminal that sends requisite tracing data to the remote network device. In addition, terminal manufactures or software providers who wish to update the applications associated with the device may do so by remotely accessing the device and communicating the updated software patches to the terminal.

Moreover, the present invention provides mobile service providers the ability to monitor vital statistics associated with deployed mobile terminals. For example, the mobile service provider can access mobile terminals to determine the strength of the wireless signal that is being received by the terminal. In this regard, the strength of signals in the wireless network can be monitored without relying on mobile terminal users reporting problems or without deploying field service personnel to measure strength of signals. In addition to monitoring signal strength, mobile service providers are provided the capability to monitor the users usage of applications and devices, such as gaming applications, cameras, etc. Such monitoring allows the service provider to gain insight into the amount of usage of applications and devices associated with mobile terminals, thereby, providing real-time access to valuable market research data.

FIG. 1 illustrates a block diagram of a communication network 100 that implements a mobile terminal having remote user access and management capabilities. As disclosed, the system, terminal and method embodiments of the present invention will be primarily described in conjunction with mobile communications applications. It should be understood, however, that the systems, terminals and methods of the present invention may be utilized in conjunction with a variety of other networks, both in the mobile communication environment and outside of the mobile communication environment. For example, the system, terminal and method of the present invention can be utilized in conjunction with wireline and/or wireless network applications.

Referring to FIG. 1, a mobile terminal 10 may include an antenna 12 for transmitting signals to and for receiving signals from a base site or base station (BS) 14. The base station is a part of a cellular network that includes elements required to operate the network, such as a mobile switching center (MSC) 16. As is known by those of ordinary skill in the art of telecommunications, the cellular network may also be referred to as a Base station, Mobile switching center and Interworking function (BMI) 18. In operation, the MSC, is capable of routing calls and messages to and from the terminal when the terminal is making and receiving calls. The MSC also provides a connection to landline trunks when the terminal is involved in a call. Further, the MSC can, but need not, be coupled to an optional server GTW 20 (Gateway).

The MSC 16 can be coupled to a network, such as a local area network (LAN), a metropolitan area network (MAN), and/or a wide area network (WAN). The MSC can be coupled to the network directly, or if the system includes a GTW 20 (as shown), the MSC can be coupled to the network via the GTW. In one typical embodiment, for example, the MSC is coupled to the GTW, and the GTW is coupled to a WAN, such as the Internet 22. In turn, devices such as processing elements (e.g., personal computers, or the like) can be coupled to the terminal 10 via the Internet. For example, in the illustrated embodiment of FIG. 1, network device 24, such as a PC, is coupled to the terminal 10 via the Internet 22. In the illustrated embodiment the network device communicates with the Internet via a conventional wireline link, it is also possible, and within the inventive concepts herein disclosed, for the network device 24 to form a wireless link with the Internet. Additional devices, controllers and access points (not shown in FIG. 1) may be required to provide the network device access to the Internet.

The terminal 10 will include a processor/controller 30 that executes a web server application 32 and a content engine application 34. The network device 24 will include a processor/controller 40 that executes a web browser application 42. The remote network device will access the Internet via the web browser application and request access to the mobile terminal by entering an IP address associated with the mobile terminal. The browser will then send a request, typically in the form of a HyperText Transfer Protocol (HTTP) request, to the mobile terminal 10. The web server application 32 will receive the request, retrieve the web page (also referred to as a portal page or a homepage) and communicate the web page back the remote network device. Once received by the network device, the web browser application will display the web page to the remote network user.

The mobile terminal homepage may be configured to provide the user of the remote network device a menu of various databases, services, applications and/or device associated with the mobile terminal. In addition, the mobile terminal homepage may be configured to display a summarized view of data associated with the mobile terminal, such as daily calendared tasks, email message status, SMS message status, voice message status and the like. It is also possible to configure the homepage to include hypertext links to other web sites or pages, such as news sources, weather sources or the like.

The user of the network device 24 will choose from the homepage menu of databases, services, applications and devices offered by the mobile terminal. Based on the chosen database, service, application or device, a HTTP request will be sent to the mobile terminal and the content engine application will process the request. In turn the content engine will query a database or access the requested service, application or device. The response to the query or access request will then be synthesized into suitable browser data and communicated back to the network device in the form of an HTTP response. The browser application in the network device will receive the HTTP response and display information in a new web page. The information in the new web page may be related to data, a service or a device associated with the mobile terminal.

In addition to network device 24 other remote network devices may communicate with the mobile terminal, absent the Internet, and provide for remote access and management, in accordance with embodiments of the present invention. For example, network device 24A includes a processing device 40 that executes a web browser application 42 and communicates with the mobile terminal 10 via a wired connection, such as a Universal Serial Bus (USB) standard connection or some other form of wired serial or parallel port connection. Typically, this type of link between the network device 24A and the mobile terminal well require special hardware in the form of USB connectors and cables. The wireline nature of this type of connection is typically limited in terms of remoteness to the mobile device. However, other than the requisite hardware requirements and a conventional web browser application, this type of connection does not require the execution of any additional software applications at the network device 24A.

Additionally, network device 24B includes a processing device 40 that executes a web browser application 42 and communicates with the mobile terminal 10 via a wireless connection, such as Bluetooth® or some other form of short-range wireless communication. This wireless connection provides no need for additional hardware or software to implemented by the network device 24B.

FIG. 1 also depicts an example of a network resource 50 residing on the Internet 22. The network resource 50 is illustrated to show that network devices 24, 24A, and 24B, as well as, the mobile terminal 10 may have access to the network resource. Network device 24 may access the resource through the Internet 22 and the mobile terminal 10 may access the resource through the BMI 18 and the Internet 22. Network devices 24A and 24B may access the resource through the mobile terminal 10, the BMI 18 and the Internet 22.

Figure 2:
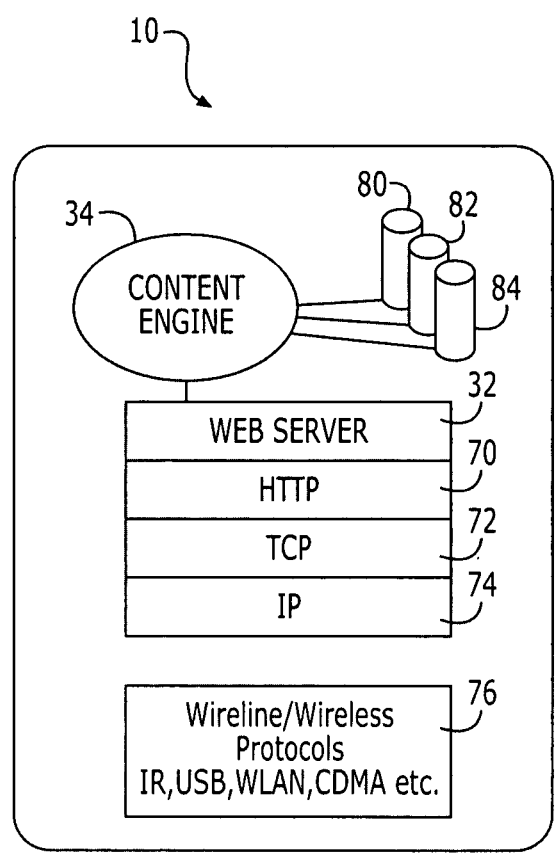
FIG. 2 is a block diagram of a mobile terminal having remote access and management capability, in accordance with an embodiment of the present invention.

FIG. 2 provides a block diagram of a mobile terminal implementing a web server application and a content engine application, in accordance with an embodiment of the present invention. The mobile terminal 10 includes a web server application 32 that provides for a remote network device to access the mobile terminal via a communication link. Typically, as depicted the communication link will be the Internet and the mobile device will implement a standard Internet protocol model, including session layer HyperText transfer Protocol (HTTP) 70, application layer Transmission Control Protocol (TCP) 72, application layer Internet Protocol (IP) 74 and physical layer 76. As previously discussed the physical layer, which defines the connection, may include wireless or wireline protocols, including Infrared (IR), Universal Serial Bus (USB), Wireless Local Area Network (WLAN), Code Division Multiple Access (CDMA), Global System for Mobile (GSM) or the like.

The mobile device will also include a content engine 32 application that is in communication with the web server and interfaces with databases 80, services 82 and devices 84 associated with the mobile device to provide remote network devices access to the same.

Figure 3:
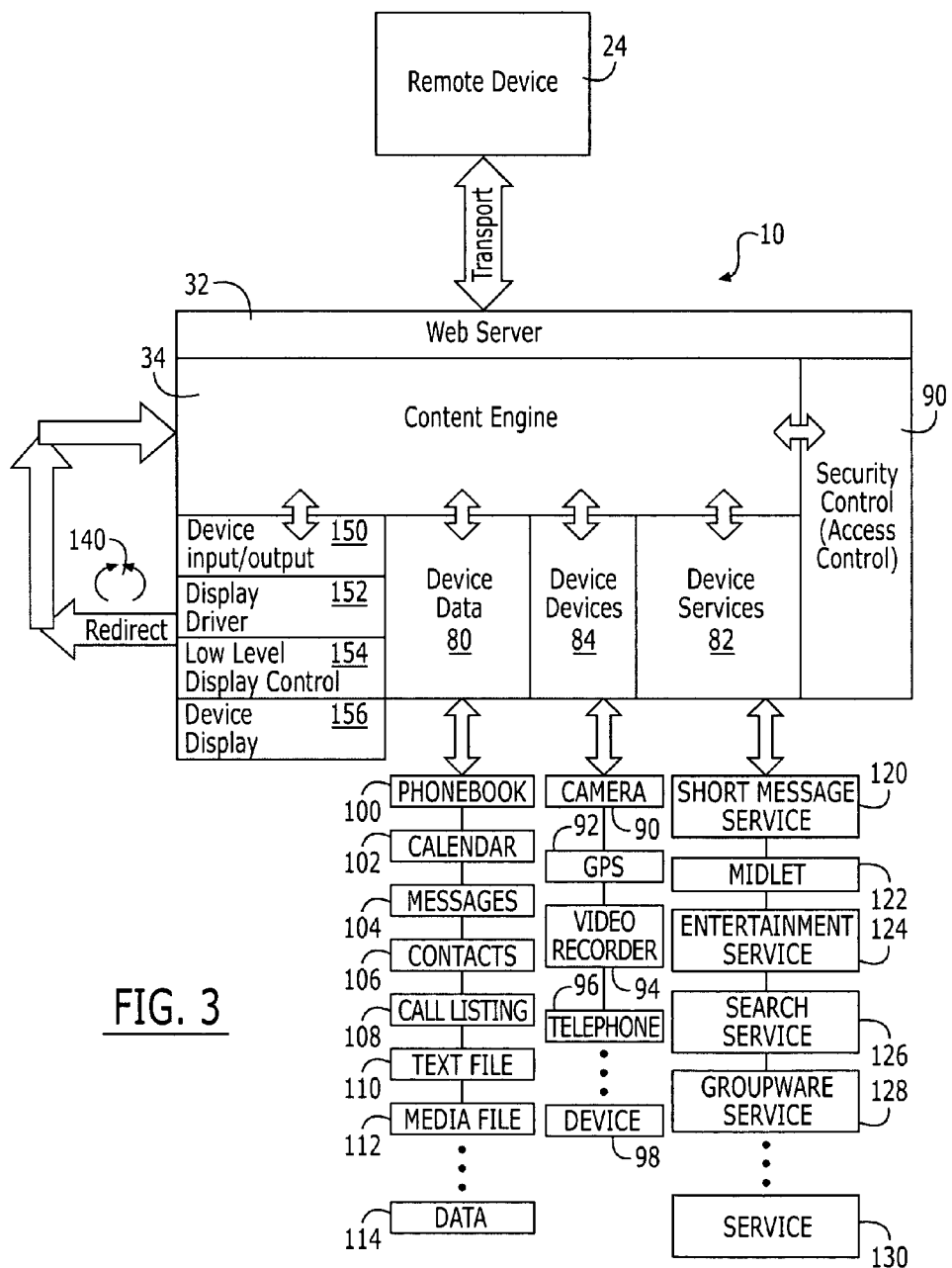
FIG. 3 is a block diagram of a mobile terminal having remote access management capability, highlighting the ability of the content engine to access the databases, services and devices associated with the mobile terminal.

FIG. 3 provides a further block diagram of the mobile terminal 10 and specifically the content engine communicating with various components associated with the mobile terminal, in accordance with an embodiment of the present invention. In the FIG. 3 diagram the remote network device 24 establishes access to the mobile terminal 10 via the web server application (not shown In FIG. 3) executed on the mobile terminal. Once access to the web server has been established, the remote network device will communicate with the content engine 32 to access databases 80, services 82 and devices 84 associated with the mobile terminal. In one embodiment of the invention, the mobile terminal may execute a security application 90 that is in communication with the content engine and limit access to the remote network device based on a security routine. Typically, the security routine will require the user of the remote network device to enter a user name and password before accessing the databases, services and devices associated with the mobile terminal. Additionally, the security routine may provide other forms of security control that limit remote network device access to the databases, services and devices.

As previously described the content engine 24 will access databases 80, services 82 and devices 84 associated with the mobile terminal 10 to provide the remote network device 24 functional access to the databases, services and device. The devices associated with the mobile terminal may include a camera or other imaging device 90, a Global Positioning System (GPS) device 92, a video playback and/or recording device 94, a telephone device 96 and any other suitable device 98 associated with the mobile terminal.

The GPS device 92 can provide location identification for the mobile device. In the instance, in which the mobile device is misplaced or lost, the remote network device can access and activate the GPS device to locate the mobile terminal. Once activated, the GPS device would calculate the device's location and send a location-identifying map to the remote network device.

The telephone device 96 can provide the ability for the remote network device to place or receive telephone calls. In this regard, the user of the remote network device accesses the phone-listing database, and chooses to place a call with an appropriate listing or a remote network device user may manually input a telephone listing. Typically, this type of telephone call will utilize Voice over IP (VoIP) to route the telephone device audio to remote network device.

The video recording device 94 can be activated to provide video stream imagery to the remote network device. In this application, the mobile terminal acts as a "web-cam" with the remote network device having remote control over the video recording device.

The device databases associated with the mobile terminal may include a telephone book database 100, a calendar database 102, a message database 104, a contacts database 106, a telephone call log database 108, a text file data base 110, a media file database 112 and other database 114 associated with the mobile terminal. The user of the remote network device may be granted access to these databases and may be provided the ability to manage these databases (e.g., edit the information) remotely.

The services associated with the mobile terminal 10 may include a Short Messaging Service (SMS) 120 or any other messaging service, a Mobile Information Device (MIDlet) application 122, an entertainment service 124, such as a gaming service, a search engine service 126, a groupware service 128 and any other service 130 associated with the mobile device. The user of the remote network device may be granted access to these services and may be provided the ability to activate these services. For, example, the remote network device would be able to download the MIDlet application and execute the application on the remote network device. In another example, a remote network device may be able to access a search service associated with the mobile terminal that allows for the remote device to search within the databases for requisite data. Additionally, games executed on the mobile device may be accessed by the remote network device and executed on the remote device for the purpose of entertaining the remote network device user. Also, a groupware application would allow the remote network device to participate in file sharing, such as media file sharing or telephone listing sharing or any other appropriate sharing function.

Additionally, the mobile terminal may implement a HTTP push application (not shown in FIG. 3) that allows information to be pushed to the remote network device. Typically, information is pushed based on the occurrence of predetermined events. For example, the mobile terminal may be configured to push information, typically in the form of a pop-up window, if the mobile terminal receives a message. Additionally, the mobile terminal may be configured with a motion detector, whereby information is pushed if at least minimum motion occurs in the mobile terminal. This type of motion-sensing pushing of information is typically implemented in conjunction with a video recording device, in which a video stream is pushed to the network device if motion occurs in the mobile device. Additionally, the mobile terminal may be configured to receive pushed information from the remote network device.

The content engine may also include or be in communication with a display redirect application 140 that provides redirect of information from the display of the mobile terminal to the content engine. In the FIG. 3 embodiment displayable information is provided to mobile terminal input/output 150, and display driver 152. Prior to being displayed on the mobile terminal display 156, a low-level display controller 158 is implemented to execute the display redirect routine. The content engine receives the output of the redirect application and converts this data into HTML text format before the information is communicated to the remote network device for display.

In this regard, FIGS. 1-3 provide for apparatus, systems, methods, and computer program products according to the invention. It will be understood that each block or step of the block diagrams and flow charts, and combinations of blocks in the block diagrams and flowcharts, can be implemented by computer program instructions. These computer program instructions may be loaded onto a computer or other programmable apparatus to produce a machine, such that the instructions which execute on the computer or other programmable apparatus create means for implementing the functions specified in the diagram block(s) or flowchart step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the diagram block(s) or flowchart step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the diagram block(s) or flowchart step(s).

Accordingly, diagram blocks or flowchart steps support combinations of means for performing the specified functions, combinations of steps for performing the specified functions and program instruction means for performing the specified functions. It will also be understood that each diagram block or flowchart step, and combinations of diagram blocks or flowchart steps can be implemented by special purpose hardware-based computer systems that perform the specified functions or steps, or combinations of special purpose hardware and computer instructions.

Thus, the present invention provides for apparatus, systems, methods and computer program products for remote user access and management of mobile terminals. The invention benefits from being able to provide access without the need to implement at the remote network device any additional software applications or hardware. Additionally, the present invention provides for the remote network device to access all the databases, services and devices associated with the mobile terminal. As such, the invention provides greater flexibility in accessing the data stored on the mobile terminal and provides the remote network device remote control of the services and devices associated with the mobile terminal.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mobile terminal apparatus, the apparatus comprising:
a processor that is configured to execute:
a web server configured to provide for a remote network device to access mobile terminal via a wireless communication link; and
a content engine application in communication with the web server that is configured to provide functional access by the remote network device to one or more devices associated with the mobile terminal; and
a memory having the web server and the content engine application stored therein.

2. The apparatus of claim 1, wherein the content engine application is configured to provide functional access by the remote network device to one or more databases associated with the mobile terminal.

3. The apparatus of claim 1, wherein the content engine application is further configured to provide functional access by the remote network device to one or more mobile terminal services associated with the mobile terminal.

4. The apparatus of claim 1, wherein the processor is further configured to execute a display redirect application configured to provide for redirecting display of accessed devices from the mobile terminal display to a display associated with the remote network device.

5. The apparatus of claim 1, wherein the processor is further configured to execute a security application configured to provide secure remote network device access to the one or more mobile terminal devices.

6. The apparatus of claim 1, wherein the content engine application configured to provide for functional access by the remote network device to one or more mobile terminal devices further defines the one or more mobile terminal devices as one or more mobile terminal devices chosen from the group consisting of a mobile terminal telephone, a mobile terminal camera, a mobile terminal video recorder, a mobile terminal audio recorder and a mobile terminal Global Positioning System (GPS) device.

7. The apparatus of claim 2, wherein the content engine application configured to provide for functional access by the remote network device to one or more mobile terminal databases further defines the one or more mobile terminal databases as one or more mobile terminal databases chosen from the group consisting of a contact database, a message database, a telephone listing database, a telephone call database, a visual image database, and a calendar event database.

8. The apparatus of claim 3, wherein the content engine application that is further configured to provide for functional access by the remote network device to one or more mobile terminal services further defines the one or more mobile device services as one more mobile terminal services chosen from the group consisting of a messaging service, an entertainment service, and a Mobile Information Device (MIDlet).

9. The apparatus of claim 1, wherein the processor is further configured to execute a search engine application in communication with the content engine application that is configured to provide the user of the remote network device the capability to search mobile terminal databases.

10. The apparatus of claim 1, wherein the data processor is further configured to execute a groupware application in communication with the content engine application that is configured to provide the remote network device the capability to share, via the communication network, mobile device database information with one or more networked devices.

11. The apparatus of claim 1, further comprising a memory module in communication with the content engine that is configured to provide the user of the remote network device the capability to store data in the memory module.

12. The apparatus of claim 1, further comprising a hypertext transfer protocol push application in communication with the content engine application that is configured to provide for information to be pushed from the mobile terminal to the remote network device during an active networking session.

13. The apparatus of claim 12, further comprising a motion sensor in communication with the hypertext transfer protocol push application that is configured to provide for information to be pushed from the mobile terminal to the remote network device during an active networking session when requisite motion occurs within the mobile terminal.

14. A method comprising:
providing for a mobile terminal that implements a web server and a content engine application configured to provide access, via the web server, to one or more devices associated with the mobile terminal;
initiating a web browser application at a remote network device that is configured to provide for a network communication link;
accessing, at the remote network device, the mobile terminal via a network connection to the web server of the mobile terminal; and
activating, at the remote network device, one or more devices associated with the mobile terminal.

15. The method of claim 14, wherein providing for a mobile terminal that implements a content engine further comprises providing for a mobile terminal that implements a content engine that is configured to provide access, via the web server, to one or more databases associated with the mobile terminal.

16. The method of claim 15, further comprising accessing, at the remote network device, one or more databases associated with the mobile terminal.

17. The method of claim 16, wherein accessing, at the remote network device, one or more databases associated with the mobile terminal further comprises accessing, at the remote network device, one or more databases chosen from the group consisting of phonebook database, electronic mail database, calendar database, a media file database, a text file database, and contact database.

18. The method of claim 14, wherein providing for a mobile terminal that implements a content engine further comprises providing for a mobile terminal that implements a content engine configured to provide access, via the web server of the mobile terminal, to one or more device services associated with the mobile terminal.

19. The method of claim 18, further comprising activating, at the remote network device, one or more device services associated with the mobile terminal.

20. The method of claim 19, wherein activating, at the remote network device, one or more devices services associated with the mobile terminal further comprises accessing, at the remote network device, one or more devices services chosen from the group consisting of a messaging service, a Mobile Information Device (MIDlet), a search service and an entertainment service.

21. The method of claim 14, wherein accessing, at the remote network device, one or more devices associated with the mobile terminal further comprises activating, at the remote network device, a Global Position System device associated with the mobile terminal for the purpose of locating the mobile terminal.

22. The method of claim 14, wherein accessing, at the remote network device, one or more devices associated with the mobile terminal further comprises activating, at the remote network device, a camera associated with the mobile terminal.

23. The method of claim 14, wherein accessing, at the remote network device, one or more devices associated with the mobile terminal further comprises activating, at the remote network device, a video recording device associated with the mobile terminal.

24. The method of claim 14, wherein accessing, at the remote network device, one or more devices associated with the mobile terminal further comprises activating, at the remote network device, a telephone associated with the mobile terminal.

25. A method comprising:
accessing, at a remote network device, mobile terminal via a network connection to a web server executed by the mobile terminal; and
managing the mobile terminal from the remote network device once the mobile terminal has been accessed by the remote network device.

26. The method of claim 25, wherein managing the mobile terminal further includes displaying at the remote network device the identical display of information provided to the mobile terminal.

27. The method of claim 25, wherein managing the mobile terminal further includes accessing the applications associated with the mobile terminal to provide diagnostic analysis to the mobile terminal.

28. The method of claim 25, wherein managing the mobile terminal further includes debugging the mobile terminal by tracing data communicated from the mobile terminal.

29. The method of claim 25, wherein managing the mobile terminal further includes monitoring the performance of the mobile terminal.

30. The method of claim 29, wherein monitoring the performance of the mobile terminal further includes monitoring the strength of the wireless signal provided to the mobile terminal.

31. The method of claim 25, wherein managing the mobile terminal further includes monitoring the usage of applications associated with the mobile terminal.

32. The method of claim 25, wherein managing the mobile terminal further includes monitoring the usage of devices associated with the mobile terminal.

33. The method of claim 25, wherein managing the mobile terminal further includes modifying the applications associated with the mobile terminals.

34. A computer program product comprising a non-transitory computer-readable storage medium having computer-readable program code instructions stored therein, the computer-readable program code instructions comprising:
a program code instruction configured for providing a remote network device access to a mobile terminal, wherein the program code instruction for providing a remote network device access to a mobile terminal comprises instructions configured for awaiting the receipt of a web-based transfer protocol request from the remote network device and instructions configured for responding to a web-based transfer protocol request received from the remote network device by communicating a web-based transfer protocol response to the remote network device; and a program code instruction configured for providing the remote network device functional access to one or more devices associated with the mobile terminal.

35. The computer program product of claim 34, wherein the program code instruction for providing the remote network device functional access to one or more devices associated with the mobile terminal further includes an instruction configured for providing the remote network device functional access to one or more databases associated with the mobile terminal.

36. The computer program product of claim 34, wherein the program code instruction for providing the remote network device functional access to one or more devices associated with the mobile terminal further includes an instruction configured for providing the remote network device functional access to one or more services associated with the mobile terminal.

37. The computer program product of claim 35, wherein the program code instruction configured for providing the remote network device functional access to one or more databases associated with the mobile terminal further defines the one or more databases as chosen from the group consisting of a phonebook database, electronic mail database, calendar database, a media file database, a text file database, and contact database.

38. The computer program product of claim 36, wherein the program code instruction configured for providing the remote network device functional access to one or more services associated with the mobile terminal further defines the one or more devices services chosen from the group consisting of a messaging service, an Mobile Information Device (MIDlet), a search service and an entertainment service.

39. The computer program product of claim 34, wherein the program code instruction configured for providing the remote network device functional access to one or more devices associated with the mobile terminal further comprises an instruction configured for providing the remote network device functional access to a telephone associated with the mobile terminal.

40. The computer program product of claim 34, wherein the program code instruction configured for providing the remote network device functional access to one or more devices associated with the mobile terminal further comprises an instruction configured for providing the accessed remote network device functional access to a Global Position System (GPS) device associated with the mobile terminal.

41. The computer program product of claim 34, wherein the program code instruction configured for providing the remote network device functional access to one or more devices associated with the mobile terminal further comprises an instruction configured for providing the remote network device functional access to a camera associated with the mobile terminal.

42. The computer program product of claim 34, wherein the program code instruction configured for providing the remote network device functional access to one or more devices associated with the mobile terminal further comprises an instruction configured for providing the remote network device functional access to a video recording device associated with the mobile terminal.

43. A system comprising:

a mobile terminal including a first processor that is configured to execute a web server and a content engine application in communication with the web server, wherein the content engine application is configured to provide functional access to one or more devices associated with the mobile terminal; and a remote network device including a second processor that is configured to execute a web browser application that is configured to provide access to the web server of the mobile terminal via a network connection and to provide access to the content engine application of the mobile terminal for the purpose of functionally accessing one or more devices associated with the mobile terminal.

44. The system of claim 43, wherein the content engine application is further configured to provide functional access to one or more databases associated with the mobile terminal.

45. The system of claim 43, wherein the content engine application is further configured to provide functional access to one or more services associated with the mobile terminal.

46. The system of claim 43, wherein the content engine application is configured to provide functional access to one or more devices associated with the mobile terminal, the one or more devices chosen from the group consisting of a telephone device, a camera device, a video recording device, an audio recording device, a Global Positioning System device.

47. The system of claim 44, wherein the content engine application is configured to provide functional access to one or more databases associated with the mobile terminal, the one or more databases chosen from the group consisting of a phonebook database, electronic mail database, calendar database, a media file database, a text file database, and contact database.

48. The system of claim 45, wherein the content engine application is configured to provide functional access to one or more databases associated with the mobile terminal, the one or more databases chosen from the group consisting of a messaging service, an Mobile Information Device (MIDlet), a search service and an entertainment service.

49. The system of claim 43, wherein the second processor executes a web browser application that is configured to provide access to the web server of the mobile terminal via a network connection, the network connection chosen from the group consisting of Internet, Universal Serial Bus, serial port, parallel port, wireless local area network and infrared.

50. The apparatus of claim 1, wherein the web server is configured to instruct the data processing device to await the receipt of a HyperText Transfer Protocol (HTTP) request from the remote network device, and wherein the web server is further configured to instruct the data processing device to respond to a HTTP request received from the remote network device by communicating an HTTP response to the remote network device.

51. The method of claim 14, wherein accessing, at the remote network device, the mobile terminal via a network connection to the web server of the mobile terminal comprises communicating a HyperText Transfer Protocol (HTTP) request to the mobile terminal via the network connection.

52. The method of claim 25, wherein accessing, at the remote network device, the mobile terminal via a network connection to the web server executed by the mobile terminal comprises communicating a HyperText Transfer Protocol (HTTP) request to the mobile terminal via the network connection.

53. The system of claim 43, wherein the web browser application of the remote network device is configured to provide access to the web server of the mobile terminal by communicating HyperText Transfer Protocol (HTTP)

requests to the web server-via the network connection and by receiving HTTP responses from the web server via the network connection.

\* \* \* \* \*